United States Patent
Agarwal et al.

(10) Patent No.: US 9,996,339 B2
(45) Date of Patent: Jun. 12, 2018

(54) ENHANCED UPDATING FOR DIGITAL CONTENT

(71) Applicant: Microsoft Corporation, Redmond, WA (US)

(72) Inventors: Abhishek Agarwal, Redmond, WA (US); Anthony D. Krueger, Woodinville, WA (US); Huy Q. Nguyen, Bothell, WA (US); Peter Cai, Bellevue, WA (US); Jefferson B. Criddle, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 70 days.

(21) Appl. No.: 14/295,478

(22) Filed: Jun. 4, 2014

(65) Prior Publication Data

US 2015/0355899 A1 Dec. 10, 2015

(51) Int. Cl.
*G06F 9/44* (2018.01)
*G06F 9/445* (2018.01)

(52) U.S. Cl.
CPC . *G06F 8/68* (2013.01); *G06F 8/65* (2013.01)

(58) Field of Classification Search
CPC ..... G06F 8/61; G06F 8/60; G06F 8/65; G06F 8/68; G06F 11/1433; G06F 17/30345; G06F 8/70; G06F 17/30174; G06F 17/30109; G06F 17/3023; G06F 8/71
See application file for complete search history.

(56) References Cited

U.S. PATENT DOCUMENTS

| | | | | |
|---|---|---|---|---|
| 6,202,207 B1* | 3/2001 | Donohue | ........... | G06F 8/65 |
| | | | | 705/59 |
| 6,401,239 B1* | 6/2002 | Miron | ........... | G06F 8/68 |
| | | | | 707/661 |
| 6,996,818 B2* | 2/2006 | Jacobi | ........... | G06F 8/68 |
| | | | | 709/223 |
| 7,149,508 B2 | 12/2006 | Herle | | |
| 7,366,824 B2 | 4/2008 | Chiang | | |
| 7,458,073 B1* | 11/2008 | Darling | ........... | G06F 8/67 |
| | | | | 717/122 |
| 7,509,636 B2 | 3/2009 | McGuire et al. | | |
| 7,530,065 B1* | 5/2009 | Ciudad | ........... | G06F 8/60 |
| | | | | 717/168 |
| 7,600,021 B2 | 10/2009 | Schottland et al. | | |
| 8,341,513 B1 | 12/2012 | Lattyak et al. | | |

(Continued)

OTHER PUBLICATIONS

Sameer Ajmani; A Review of Software Upgrade Techniques for Distributed Systems; 2002 semanticscholar; 19 pages; <https://pdfs.semanticscholar.org/1f83/241463821b996611f513a8c9b89bf835bc09.pdf>.*

(Continued)

*Primary Examiner* — Thuy Dao
*Assistant Examiner* — Cuong V Luu

(57) ABSTRACT

Disclosed herein are systems, methods, and software to enhance updates to digital content. In at least one implementation, an update agent identifies from a set of files at least a file that is scheduled to be updated from a present version of the file to a new version of the file as part of an update to the set of files. The update may include a set of delta files for updating the file from previous versions of the file to the new version and a complete file for updating the file to the new version.

19 Claims, 7 Drawing Sheets

(56) References Cited

U.S. PATENT DOCUMENTS

| | | | | |
|---|---|---|---|---|
| 8,392,906 | B2* | 3/2013 | Broussard | G06F 8/68 717/168 |
| 9,244,673 | B2* | 1/2016 | Chinn | G06F 8/65 |
| 2003/0018694 | A1 | 1/2003 | Chen et al. | |
| 2004/0226008 | A1* | 11/2004 | Jacobi | G06F 8/68 717/168 |
| 2005/0010576 | A1 | 1/2005 | Ren et al. | |
| 2005/0132348 | A1* | 6/2005 | Meulemans | G06F 8/65 717/168 |
| 2005/0132356 | A1* | 6/2005 | Cross | G06F 8/68 717/174 |
| 2005/0210459 | A1* | 9/2005 | Henderson | G06F 8/65 717/168 |
| 2006/0048130 | A1* | 3/2006 | Napier | G06F 8/65 717/168 |
| 2006/0112152 | A1 | 5/2006 | Napier et al. | |
| 2007/0288533 | A1 | 12/2007 | Srivastava et al. | |
| 2009/0113412 | A1* | 4/2009 | Shribman | G06F 17/30067 717/170 |
| 2009/0260004 | A1* | 10/2009 | Datta | G06F 8/65 717/175 |
| 2011/0113226 | A1 | 5/2011 | Ewington et al. | |
| 2011/0173601 | A1 | 7/2011 | De Los Reyes | |
| 2012/0311111 | A1 | 12/2012 | Frew et al. | |
| 2013/0332916 | A1* | 12/2013 | Chinn | G06F 8/65 717/169 |
| 2014/0007074 | A1 | 1/2014 | Sporkert et al. | |

OTHER PUBLICATIONS

Lizhou Yu et al.; A Framework for Live Software Upgrade; 2002 IEEE; 10 pages; <http://ieeexplore.ieee.org/stamp/stamp.jsp?tp=&arnumber=1173236>.*

Dennis K. Nilsson et al.; Secure Firmware Updates over the Air in Intelligent Vehicles; 2008 IEEE; pp. 380-384; <http://ieeexplore.ieee.org/stamp/stamp.jsp?tp=&arnumber=4531926>.*

Janghoon Lyu et al.; A Procedure Based Dynamic Software Update; 2001 IEEE; pp. 271-280; <http://ieeexplore.ieee.org/stamp/stamp.jsp?tp=&arnumber=941412>.*

G. Pruett et al.; BladeCenter systems management software; 2005 IBM; pp. 963-975; <http://ieeexplore.ieee.org/stamp/stamp.jsp?tp=&arnumber=5388766>.*

Michael A. Ogush et al.; A Template for Documenting Software and Firmware Architectures; 2000 HP; 38 pages; <https://www.cs.helsinki.fi/group/os3/HP_arch_template_vers13_withexamples.pdf>.*

Baldani, et al., "CyanDelta", Published on: Oct. 21, 2012, Available at: http://www.cyandelta.com/.

"Reducing Download Size for iOS App Updates", Published on: Aug. 22, 2013, Available at: https://developer.apple.com/library/ios/qa/qa1779/_index.html.

"Using Binary Delta Compression (BDC) Technology to Update Windows Operating Systems", Retrieved on: Mar. 20, 2014, Available at: http://www.microsoft.com/en-us/download/details.aspx?id=1562.

Tang, et al., "A Tunable Version Control System for Virtual Machines in an Open-Source Cloud", In IEEE Transactions on Services Computing, Feb. 28, 2014, 14 pages.

Panta, et al., "Efficient Incremental Code Update for Sensor Networks", In ACM Transactions on Sensor Networks, vol. 7, No. 4, Article 30, Feb. 2011, pp. 30:1-30:32.

Li, et al., "Fast Scalable Optimization to Configure Service Systems having Cost and Quality of Service Constraints", In Proceedings of the 6th international conference on Autonomic computing, Jun. 15, 2009, 10 pages.

"Planning for Content Management in Configuration Manager", Published on: Dec. 6, 2012 Available at: http://technet.microsoft.com/en-in/library/gg712321.aspx.

"Agile Deployment", Published on: Feb. 26, 2012 Available at: http://www.kwatee.net/product.

"International Search Report & Written Opinion Issued in PCT Application No. PCT/US2015/033634", dated Oct. 7, 2015, 9 Pages.

"Second Written Opinion Issued in PCT Application No. PCT/US2015/033634", dated Jul. 4, 2016, 5 Pages.

"International Preliminary Report on Patentability Issued in PCT Application No. PCT/US2015/033634", dated Oct. 7, 2016, 6 Pages.

* cited by examiner

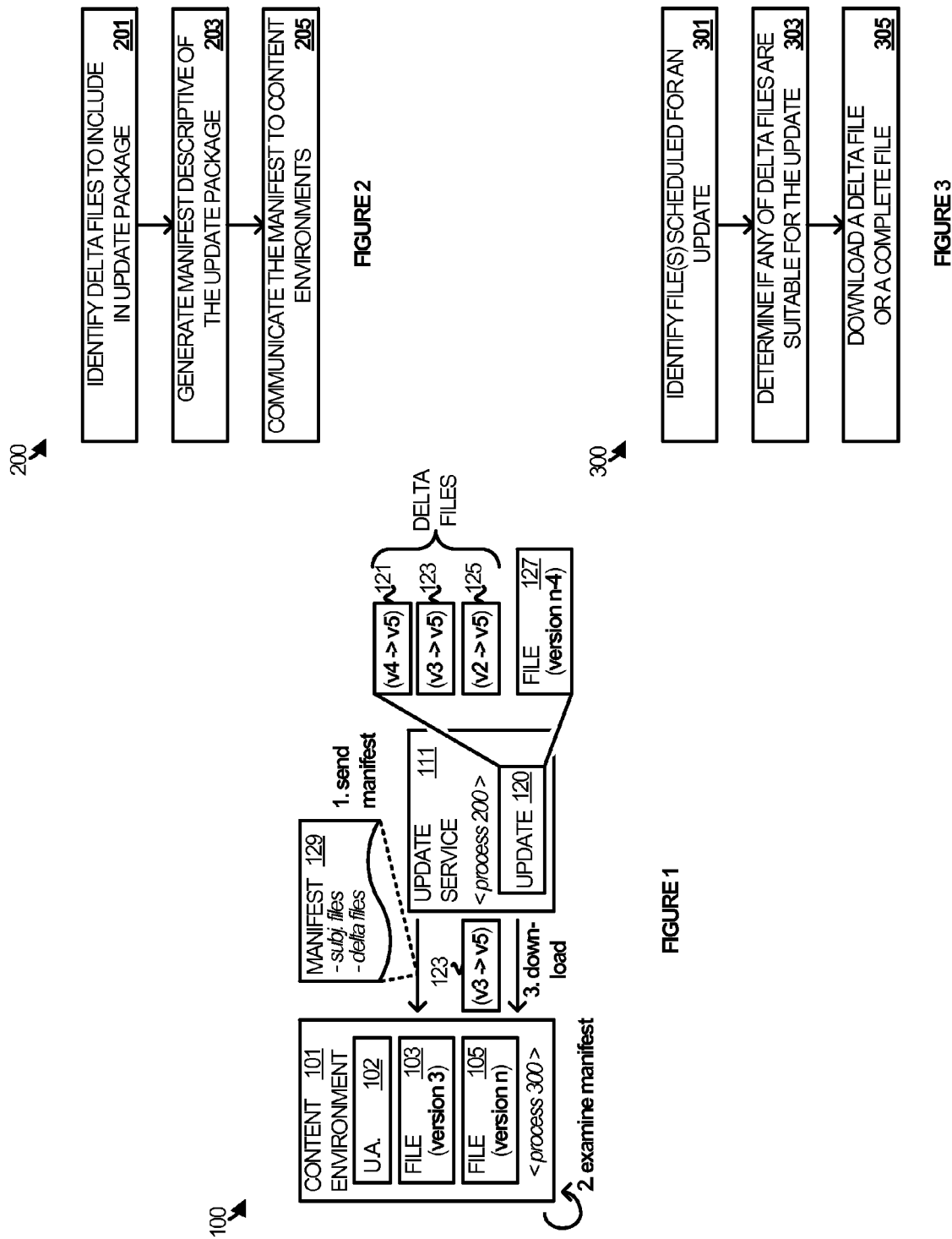

ENHANCED UPDATING FOR DIGITAL CONTENT

TECHNICAL FIELD

Aspects of the disclosure are related to computing hardware and software technology, and in particular, to updating digital content.

TECHNICAL BACKGROUND

Updates to digital content of all types are delivered via the cloud with increased frequency. Whereas some software packages would be updated once per year, or with even less frequency, it is now common for software developers to provide updates on a monthly basis or even faster than that. Other types of digital content, such as mapping databases and media libraries, are also updated with increased frequency.

In the past, updates to applications could be accomplished by downloading and installing a new installation package. A drawback to this technique was that a user's customization of an application program could be lost when new files in the installation package replaced older versions of the files. Another drawback was the large size of some installation packages, which could consume considerable amounts of time and bandwidth.

In many cases, the difference in files or binaries from one version of an application to another would not vary by much, making the full-installation process even less efficient. Even within binaries that did change from one version to the next, the change could be minimal. These and other drawbacks were mitigated by the development of patching. With patching, a limited set of files in an application package are targeted for updating, thereby limiting how many files need to be downloaded.

Differential compression technologies like binary delta compression can be leveraged to reduce the overall size of an update package, whether it includes patch files or complete files. Binary delta compression allows only the difference between old and new files to be downloaded during the update process. Thus, an update package may include a delta file that brings an old version of a file up-to-date with respect to a new version of the file, without having to download a complete version of the file.

While patching and differential compression technologies may improve the performance of a particular update, developers are confronted with a new situation due to the rapidity with which updates are created for digital content packages. Because updates are produced with greater frequency, the range of possible update states has expanded. To continue with present update paradigms implies that more and more delta files will need to be maintained in order to support all of the possible update states.

OVERVIEW

Provided herein are systems, methods, and software to enhance the process of updating digital content. In at least one implementation, an update agent identifies from a set of files at least a file that is scheduled to be updated from a present version of the file to a new version of the file as part of an update to the set of files. The update may include a set of delta files for updating the file from previous versions of the file to the new version and a complete file for updating the file to the new version.

The update agent determines if any of the set of delta files can be used to update the file from the present version to the new version. If the set of delta files includes at least a delta file with which to update the file from the present version to the new version, the delta file is downloaded and used to update the file. If none of the set of delta files can be used to update the file from the present version to the new version, the complete file with which to update the file to the new version is downloaded.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 1 illustrates an update architecture in an implementation.

FIG. 2 illustrates an update process in an implementation.

FIG. 3 illustrates an update process in an implementation.

TECHNICAL DISCLOSURE

Figure 4:
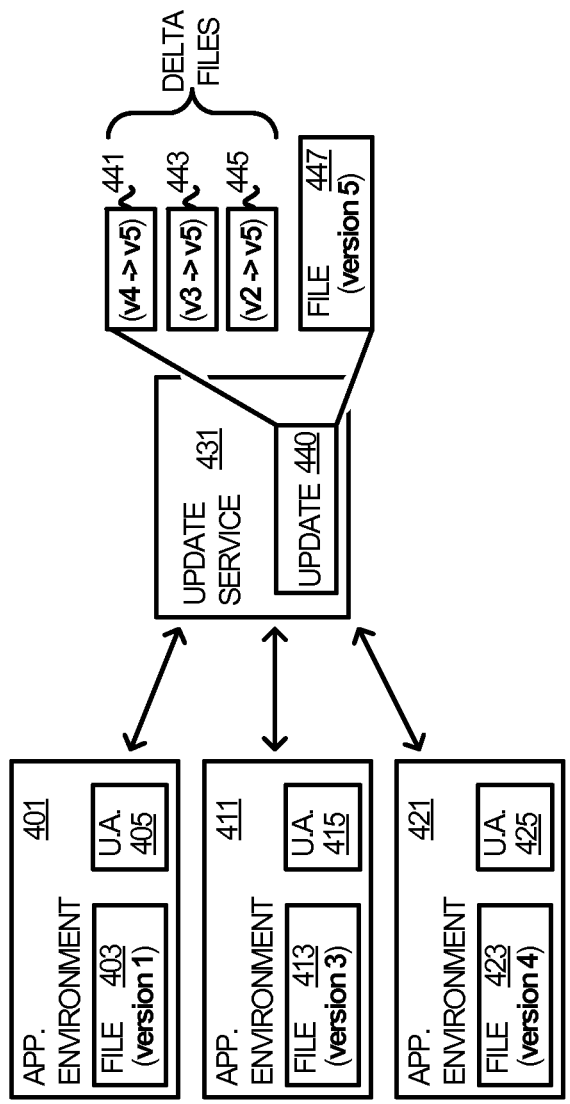
FIG. 4 illustrates an update architecture in an implementation

Implementations disclosed herein enable enhanced updates for digital content whereby a limited set of delta files may be produced and maintained for updating files from previous versions to more recent versions. Update agents may then selectively download the delta files depending upon the update state of an associated file. When a suitable delta file is not available, the update agents may download complete versions of the new files.

Such implementations help to accommodate the increased frequency with which updates to digital content are produced and the corresponding increased range of possible update states resulting therefrom. In the past, when updates were produced at a rate of once per year or eighteen months, for example, the variety of update states that could exist in local installations varied only so much. For instance, if two updates from a base state of a software package were produced over the course of three years, then at the end of the three years only three different update states would be possible. Producing and maintaining delta files suitable for bridging all of the update states would thus be a reasonable endeavor.

With the increased frequency of update production, in the same three year span a much greater number of update states are likely. For instance, if a software package is updated on a monthly bases, then over the course of three years there could be dozens of different update states. Producing and maintaining all of the delta files needed to bridge instances of a software package in all of their various update states to the most recent version of the software package is an arduous and inefficient task.

As discussed herein, the number of delta files that are supported can be limited to such that only a subset of the various update states that may exist can be bridged to a new version of digital content using the delta files. This technique reduces the amount of effort and resources that would otherwise be involved in producing and maintaining update files.

The delta files that are available as part of the update may be enumerated in an update manifest that is communicated by an update service to update agents running in various content environments. A given update agent may examine the manifest to identify which file (or files) in a set of files is targeted for an update from a previous version to a new version of the file. The manifest may also enumerate the delta files that are available for updating the file from previous versions of the file to the new version. A complete file for updating the file to the new version may also be included in the update.

The update agent can determine from the manifest whether or not a delta file is available in the update that is suitable for updating the file from the present version to the new version. If a suitable delta file is available, the update agent can initiate a download of it from the update service or optionally from some other source. If a suitable delta file is not available, then the complete file can be downloaded and used to update the file.

A given software package or other type of digital content that is the target of an update may include a set of files, at least some of which are subject to the update. Accordingly, the update may include sets of delta files. Each individual set of delta files may correspond to an individual one of the files in the update target. In an example a software package may include multiple files. An update to the software package may thus include one set of delta files corresponding to one of the software files and another set of delta files corresponding to another one of the software files.

In these scenarios, an update agent can examine a manifest to determine which file or subset of files in a software package or other digital content is subject to an update. From there, the update agent can determine for each file in the subset of files whether or not the update includes a delta file suitable for updating that file from a previous version to anew version. In some scenarios, a manifest may describe for the delta files in an update, to which one of previous versions of a file each of the delta files may apply.

The update agents may initiate a request to an update service to obtain a manifest for an update. Such requests may be made in response to notifications provided by the update service that an update is available. However, alternative techniques may be used for delivering a manifest, such as the update service communicating the manifest along with update notifications.

Examples of digital content include individual software applications, software packages or software suites, video content, digital books and periodicals, digital music, and any other type of digital content that may be updated from time to time. Examples of files that may be updated include a database file, an application file, an operating system file, and a media file (such as video, audio, or digitally printed media).

In some implementations, an update service may track an update state of software packages that each include a set of files and generate a manifest for the software packages based on their update state. This may include, for example, tracking the share of installed instances of a software package that correspond to one version or another of a range of possible versions of the software. Depending on how great a share of the installed instances that a particular version has, a delta file may be produced for each file in the package that would be suitable for updating those installed instances of the package from that version of the software package to a new version.

The share of installed instances that a given version occupies may also be considered when determining whether or not to build a delta file (or set of files) at all. As a share for a given version declines over time, it may at some point pass below a certain threshold such that no delta files will be produced. The manifest generated for an update may identify the aforementioned delta file or files that are produced for a given update target and the particular version from which a given delta file is capable of updating a file.

Turning now to FIG. 1, update architecture 100 includes content environment 101 and update service 111. Content environment 101 includes update agent 102, file 103, and file 105. Files 103 and 105 may be subject to updates provided by update service 111 from time to time. Update 120 represents one such update and includes delta file 121, delta file 123, delta file 125, and file 127.

In operation, update 120 is developed and a corresponding manifest generated that describes the contents of update 120. Manifest 129 is representative of a manifest that may be produced with respect to update 120. Manifest 129 includes information indicative of what files in a content environment may be scheduled for updating. The information is also indicative of the content available in the update, such as which delta files are in the update and which complete files are in the update.

Each of the delta files specified in the manifest may be used to update a target file from one of various previous versions to a recent version. The information in manifest 129, in addition to identifying the delta files, may identify from which previous version the delta file may be used to update a target file to the recent version of the file. In this operational scenario, delta file 121 represents the difference between a fourth and a fifth version of a file; delta file 123 represents the difference between a third and the fifth version of the file; and delta file 125 represents the difference between a second version of the file and a fifth version of the file. File 127 represents the complete fifth version of the file.

Update service 111 communicates manifest 129 to content environment 101 and possibly to other content environments (not shown) that could be availed of update 120. Update agent 102 examines manifest 129 to determine which delta file or files to download from update service 111. In some scenarios, no delta files may be downloaded. Rather, a complete version of the file or files being updated may be downloaded.

Once the appropriate delta file(s) or complete file(s) is identified, the delta file or complete file is downloaded to content environment 101 from update service 111. The target file may then be updated accordingly. In this scenario, delta file 123 is identified and downloaded in order to update file 103 from the third version to the fifth version.

FIG. 2 illustrates an update process 200 that may be employed by update service 111 in the context of the operational scenario discussed with respect to FIG. 1. Referring parenthetically to the steps described in FIG. 2, update service 111 identifies which file or files to include in an update package (step 201). This may include identifying both delta files and complete files associated with an update. Which delta files are included in the update could be determined automatically based on telemetry data that describes the update or installation state of software packages. In other scenarios identifying the delta files for inclusion in an update could encompass receiving user input or other direction via a user interface that specifies which delta files to include.

Update service 111 then generates manifest 129, which is descriptive of the contents of the update (step 203). The manifest may be a file, a message, a series of messages, or any other data structure suitable for carrying such information. The manifest is communicated by update service 111 to content environment 101 and possibly to other content environments (step 205).

FIG. 3 illustrates in more detail an update process 300 that may be employed by update agent 102 in the context of the operational scenario discussed with respect to FIG. 1. Referring parenthetically to the steps described in FIG. 3, update agent 102 examines manifest 129 to identify which file or files in content environment 101 is subject to an update (step 301). For each file of the files subject to the update, update agent 102 determines whether or not any of the delta files included in an update package are suitable for updating the subject file to a more recent version of the file (step 303). This may be accomplished by comparing the versioning information for each delta file to an update state for the subject file.

If a delta file exists that can be used to update the subject file to the more recent version, then update agent 102 initiates a download of the delta file from update service 111 (step 305) or some other content source. However, if a suitable delta file is not available, then a complete version of the file is downloaded.

Referring back to FIG. 1, content environment 101 may be any computing environment in which files may be hosted and a user agent may run that is capable of updating the files. Examples of content environment 101 include, but are not limited to, local run-time environments, operating system environments, web browser environments, virtual machines, sand-box environments, installation environments, and virtualized environments, as well as any combination or variation thereof.

Content environment 101 may be implemented in a single computing device or distributed across multiple computing devices. Computing system 901 is representative of one such computing platform and is discussed in more detail below with respect to FIG. 9. However, examples of a suitable computing device(s) for implementing content environment 101 include any variety of personal computers, including laptops, desktops, tablets, and hybrid computers. Other examples include mobile phones, smart phones, gaming devices, smart televisions and other smart appliances, wearable computing devices, server computers, virtual servers, virtual machines, or any other suitable computing device.

Update agent 102 is representative of any software application, utility, module, component, or collection thereof, capable of communicating with update service 111 and implementing update process 300. As update agent 102 runs within the context of content environment 101, it may be implemented in program instructions stored on an executed by a suitable computing device, of which computing system 901 is representative. Update agent 102 may execute in a stand-alone fashion or may be integrated into other applications, utilities, modules, or components.

Update service 111 is representative of any software application or service capable of communicating with update agent 102 and implementing update process 200. Update service 111 may be implemented in program instructions stored on or executed by a suitable computing device or devices, of which computing system 901 is representative. Update service 111 may be a stand-alone service or may be integrated with other services, such as productivity application services, communication services, gaming services, e-commerce services, an online application store, or any other type of service, combination of services, or variation thereof.

File 103 and file 105 represent any type of file that may be considered digital content and that may be updated from time to time. Examples include program application files, such as executable files, library files, database files, and operating system files. Other examples include media files, such as movies, music, digital literature, periodicals, or any other type of digital content file.

It may be appreciated from the foregoing discussion of FIGS. 1-3 that various technical effects may be achieved when implementing enhanced updating as discussed herein. As mentioned, the sheer quantity of delta files that would otherwise be needed to accommodate the increased rate of update production can be limited or mitigated. In addition, allowing an update agent to selectively download delta files saves network bandwidth and local storage capacity. Other technical effects are possible in place of or in addition to those described herein and may be considered within the scope of the present disclosure.

FIG. 4 illustrates update architecture 400 in another implementation. Update architecture 400 includes application environment 401, application environment 411, and application environment 421. Application environments 401, 411, and 421 include update agent 405, update agent 415, and update agent 425 respectively, which are in communication with update service 431 to receive updates to applications installed in the application environments. The applications include files, represented by file 403, file 413, and file 423 in each of application environments 401, 411, and 421 respectively. Update 440 is representative of an update package with which files 403, 413, and 423 may be updated.

Update 440 includes delta file 441, delta file 443, and delta file 445. Delta files 441, 443, and 445 each represent the difference between a previous version of a file being updated and a more recent version of the file to which it is being updated. In this example, delta file 441 represents the difference between the fourth and fifth versions of a file; delta file 443 represents the difference between the third and fifth versions of the file; and delta file 445 represents the difference between the second and fifth versions of the file. Update 440 also includes file 447, which represents a complete, fifth version of the file.

Figure 5:
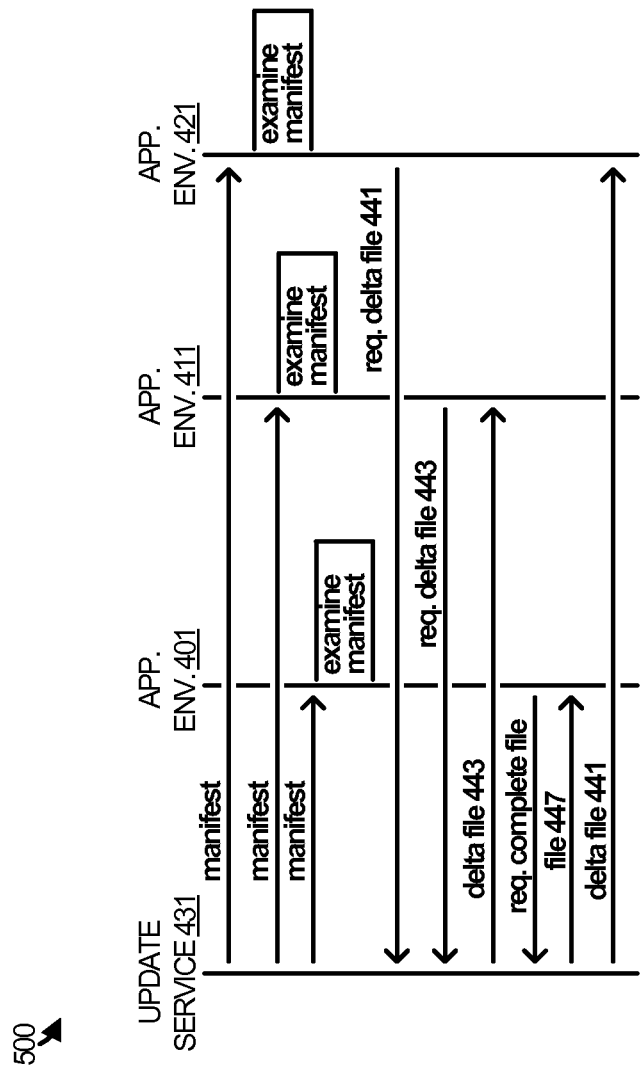
FIG. 5 illustrates an operational sequence in an implementation.

FIG. 5 illustrates an operational sequence 500 that is representative of the flow of information and data between update service 431 and application environments 401, 411, and 421 in one implementation. In operation, update service 431 generates a manifest that includes information indicative of what files in a set of files may be scheduled for an update. The information may also be indicative of which specific files are available in the update, such as which delta files are in the update and which complete files are in the update. Thus, in this example sequence the manifest may identify a file targeted for updating (corresponding to files 403, 413, and 423 in application environments 401, 411, and 421 respectively), delta files 441, 443, 445, and file 447.

Update service 431 communicates the manifest to each of application environments 401, 411, and 421. Update agents 405, 415, and 425 in application environments 401, 411, and 421 respectively examine the manifest to determine how to proceed with the update, including determining which delta file to download, or in the absence of a suitable delta file, which complete file to download.

It may be appreciated that the versioning of files 403, 413, and 423 in FIG. 4 differ relative to each other. As such, update agents 405, 415, and 425 each reach a different determination with respect to which delta file of delta files 441, 443, and 445 to download—if any at all. Update agent 425 determines to download delta file 441 and requests it from update service 431 accordingly. Delta file 441 is selected by update agent 425 because the version of file 423 is version four. Thus, file 423 can be updated to version five by using delta file 441. Update agent 415 in application environment 411 resolves to use delta file 443 to update file 413 from version three to version five and initiates the download of delta file 443 accordingly.

However, update agent 405 determines that none of the delta files 441, 443, 445 available in update 440 are suitable for updating file 403. This is the case because the version of file 403 is version one, but no delta files have been produced to take such files from version one to version five. Accordingly, update agent 405 in application environment 401 initiates a download of the full version of the file, file 447, in order to update file 403 to version five. File 447 can be used to replace file 403.

Referring back to FIG. 4, application environments 401, 411, and 421 may each be representative of any computing environment in which files may be hosted and a user agent may run that is capable of updating the files. Examples of application environments 401, 411, and 421 include, but are not limited to, program applications, local run-time environments, operating system environments, web browser applications, virtual machines, sand-box environments, installation environments, and virtualized environments, as well as any combination or variation thereof. Application environments 401, 411 and 421 may each be implemented in a single computing device or distributed across multiple computing devices. Computing system 901 is representative of one such computing platform and is discussed in more detail below with respect to FIG. 9.

Update agents 405, 415, and 425 are each representative of any software application, utility, module, component, or collection thereof, capable of communicating with update service 431 and implementing an update process. Update agents 405, 415, and 425 may each run within the context application environments 401, 411, and 421 respectively and may be stored on and executed by a suitable computing device, of which computing system 901 is representative. Update agents 405, 415, and 425 may execute in a stand-alone fashion or may be integrated into other applications, utilities, modules, or components.

Update service 431 is representative of any software application or service capable of communicating with update agents 405, 415, and 425 and implementing an update process. Update service 431 may be implemented in program instructions stored on or executed by a suitable computing device or devices, of which computing system 901 is representative. Update service 431 may be a stand-alone service or may be integrated with other services, such as productivity application services, communication services, gaming services, e-commerce services, an online application store, or any other type of service, combination of services, or variation thereof.

Files 403, 413, and 423 each represent any type of file that may be considered digital content and that may be updated from time to time. Examples include program application files, such as executable files, library files, database files, and operating system files. Other examples include media files, such as movies, music, digital literature, digital periodicals, or any other type of digital content file.

It may be appreciated from the foregoing discussion of FIGS. 4-5 that various technical effects may be achieved when implementing enhanced updating as discussed herein. In this example, bandwidth is conserved when each update agent downloads a different, individual delta file, rather than each update agent downloaded all available delta files. In addition, a delta file need not be maintained for updating files from version one to version five, thereby conserving production and maintenance resources.

Figure 6:
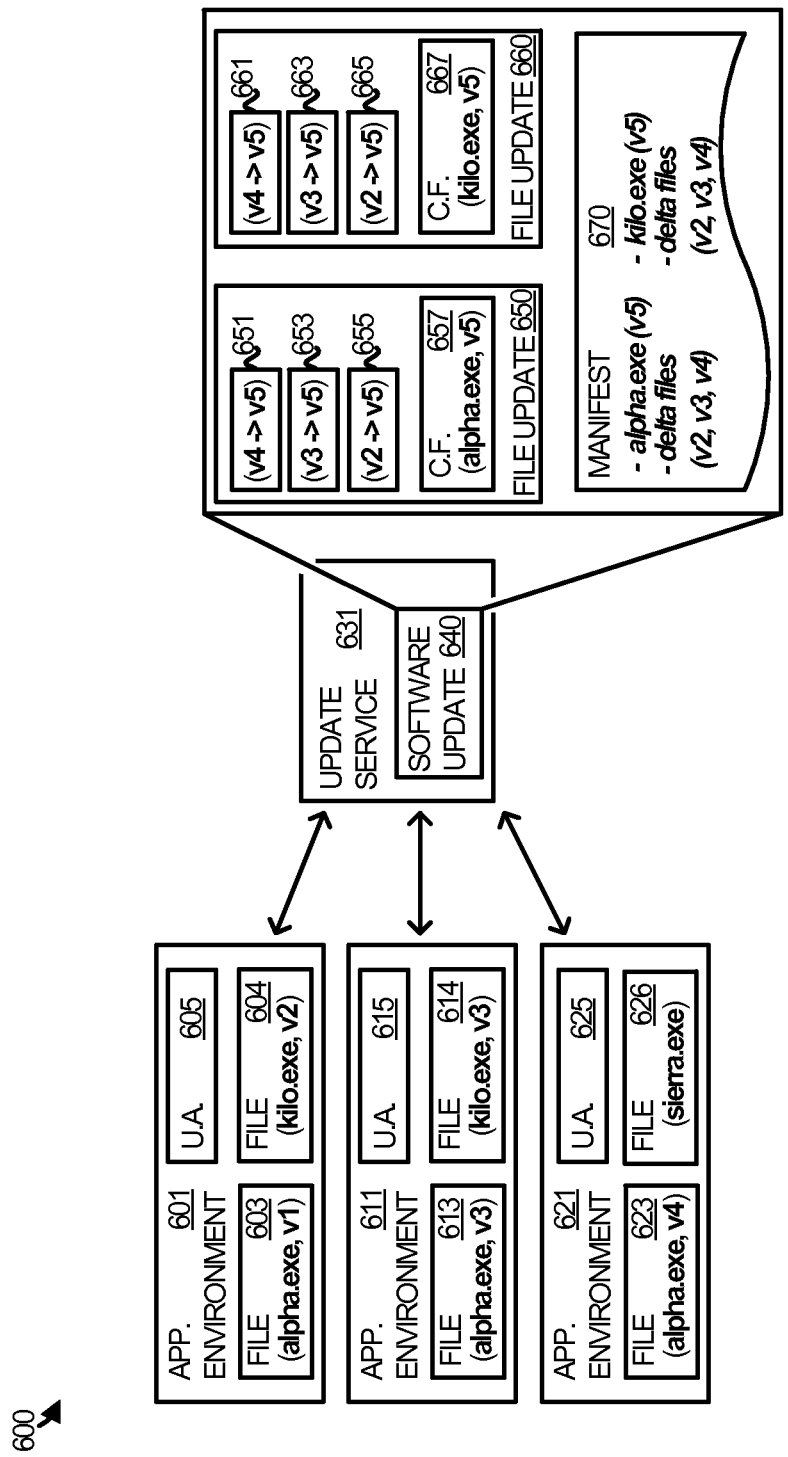
FIG. 6 illustrates an update architecture in an implementation.

FIG. 6 illustrates update architecture 600 in an implementation where multiple files are subject to an update. Update architecture 600 includes application environment 601, application environment 611, and application environment 621. Application environments 601, 611, and 621 each include an update agent that communicate with update service 631 to facilitate updates to a software package installed in each of application environments 601, 611, and 621.

In particular, application environment 601 includes update agent 605 that assists with updating file 603 and file 604, which are part of the software package. Application environment 611 includes update agent 615 that assists with updating file 613, and file 614, which also belong to the software package. Application environment 621 includes update agent 625 for updating file 623 and file 626, which are also part of the software package. Thus, it may be appreciated that each set of files in each of the application environments 601, 611, and 621 represent an instance of the software package installed in each application environment.

Each instance of the software package may differ slightly relative to other instances. This may occur, for instance, due to one instance being updated less frequently than another. As an example, file 603 represents a first version of a file in the package named "alpha.exe" and file 604 represents a second version of another file in the package named "kilo.exe." In application environment 611, file 613 represents a third version of the alpha.exe file, while file 614 represents a third version of the kilo.exe file. File 623 in application environment 621 represents a fourth version of the alpha.exe file and file 626 represents any version of a file named "sierra.exe," which may have also been a part of the software package at some point in time. It can be appreciated from these examples that, while each application environment includes the same software package installed therein, the update state associated with each file in the package may vary from environment to environment, and indeed even from file to file.

Update service 631 includes software update 640, which is representative of an update with which the instances of the software package installed in application environments 601, 611, and 621 may be updated. For exemplary purposes, software update 640 includes update packages for two files, represented by file update 650 and file update 660. File update 650 includes delta files and a complete file for updating the alpha.exe files in application environments 601, 611, and 621 to a fifth version of the file, represented by delta file 651, delta file 653, delta file 655, and complete file 657. File update 660 includes delta files and a complete file for updating the kilo.exe files in application environments 601, 611, and 621 to a fifth version of the file, represented by delta file 661, delta file 663, delta file 665, and complete file 667. Software update 640 also includes a manifest 670 that describes the contents of software update 640.

In operation, software update 640 may be produced in a build or development environment (or both) and readied for staging in update service 631. Once software update 640 is ready, notification is provided to application environments 601, 611, 621. Update agents 605, 615, and 625 employ an update process 700 in this context, which is illustrated in detail in FIG. 7.

Figure 7:
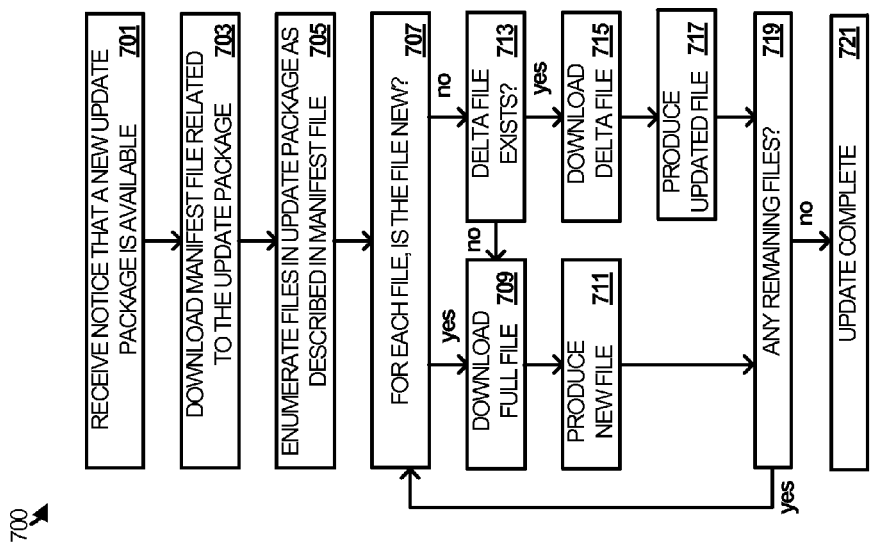
FIG. 7 illustrates an update process in an implementation.

Referring to FIG. 7, an update agent (such as update agents 605, 615, and 625) receives notification that a new update package is available (step 701). This may occur when, for example, the update agent polls an update service or when such notification is pushed to the update agent or provided in some other manner. The update agent responsively requests and downloads an update manifest that describes which files to be updated as part of the update (step 703)

The manifest also describes which delta files and which complete files are available. The delta files are described in association with which versions of a corresponding file each delta file may be capable of updating. The update agent processes the manifest to enumerate the various files that are identified in the manifest as subject to be updated (step 705). Each file that is enumerated is analyzed by the update to agent to determine if it is a new file as opposed to an existing file in the local instance of the software package step 707). If the file is new, then the update agent downloads the full file (step 709) and uses it to produce a new version of the file (step 711).

However, if the file is not new, then the update agent examines the manifest to determine whether or not a delta file is included in the update that is suitable for updating each file (step 713). If not, then the update agent downloads the full file (step 709) and produces the new version of the file. If a suitable delta file does exist and is included in the update, then the update agent downloads the delta file (step 715) and produces an updated version of the file using the delta file (step 717).

After producing a new file or an updated file, the update agent determines whether or not any other files enumerated based on the manifest remain to be updated (step 719). If so, then update process 700 returns to step 707). But if there are not any remaining files needing to be updated, then the update is complete (step 721).

Figure 8:
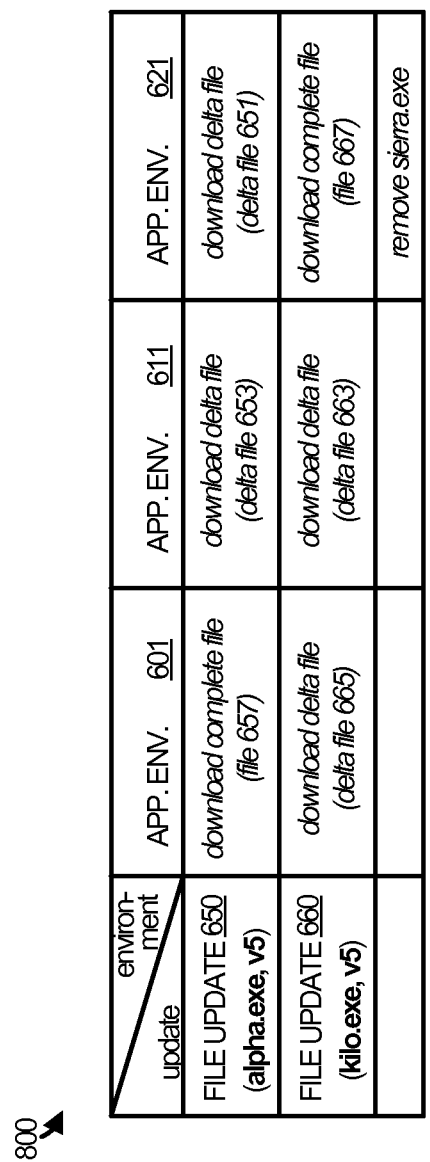
FIG. 8 illustrates the results of an update process in an implementation.

FIG. 8 includes a table 800 that illustrates results that may occur when update agents 605, 615, and 625 running in application environments 601, 611, and 621 respectively employ update process 700 in the context of the scenario provided in FIG. 6. Table 800 includes rows defined by the name of the file being updated (alpha.exe and kilo.exe) and columns corresponding to the application environment in which each of the files is updated. Each cell defined by a row and a column includes information that expresses how a particular file in a particular application environment was updated, per update process 700.

In this example scenario, file update 650 would be applied in application environment 601 with respect to the alpha.exe file. Update agent 605 would determine to download the complete file in order to update the alpha.exe file because no suitable delta file was included to update file 603 from version one to version five. Conversely, update agent 605 would download delta file 665 in order to update the kilo.exe file from version two to version five.

With respect to application environment 611, update agent 615 would determine to download delta file 653 in order to update file 613 from the third version of the alpha.exe file to the fifth version. In addition, update agent 615 would download delta file 663 in order to update file 614 from the third version of the kilo.exe file to the fifth version.

With respect to application environment 621, update agent 625 would determine to download delta file 651 for use in updating file 623 from the fourth version of the alpha.exe file to the fifth version. But with respect to updating a local version of the kilo.exe file, update agent 625 would have encountered a situation where the file did not exist locally. Accordingly, update agent 625 would download complete file 667 so as to obtain a complete version of the kilo.exe file in the fifth version.

Table 800 also illustrates that update agent 625 could optionally remove file 626, named sierra.exe. This may occur in some scenarios where an update package no longer includes files that had previously been included in a software suite. In some scenarios an update agent may conclude by the absence of a file in a manifest that the file could be removed. In other scenarios, the manifest could explicitly specify a file for removal.

Referring back to FIG. 6, application environments 601, 611, and 621 may each be any computing environment in which files may be hosted and a user agent may run that is capable of updating the files. Examples of application environments 601, 611, and 621 include, but are not limited to, program applications, local run-time environments, operating system environments, web browser applications, virtual machines, sand-box environments, installation environments, and virtualized environments, as well as any combination or variation thereof. Application environments 601, 611 and 621 may each be implemented in a single computing device or distributed across multiple computing devices. Computing system 901 is representative of one such computing platform and is discussed in more detail below with respect to FIG. 9.

Update agents 605, 615, and 625 are each representative of any software application, utility, module, component, or collection thereof, capable of communicating with update service 631 and implementing an update process. Update agents 605, 615, and 625 may each run within the context of application environments 601, 611, and 621 respectively and may be stored on and executed by a suitable computing device, of which computing system 901 is representative. Update agents 605, 615, and 625 may execute in a stand-alone fashion or may be integrated into other applications, utilities, modules, or components.

Update service 631 is representative of any software application or service capable of communicating with update agents 605, 615, and 625 and implementing update process 700. Update service 631 may be implemented in program instructions stored on or executed by a suitable computing device or devices, of which computing system 901 is representative. Update service 631 may be a stand-alone service or may be integrated with other services, such as productivity application services, communication services, gaming services, e-commerce services, an online application store, or any other type of service, combination of services, or variation thereof.

Files 603, 604, 613, 614, 623, and 624 each represent any type of file that may be considered digital content and that may be updated from time to time. Examples include program application files, such as executable library files, database files, and operating system files. Other examples include media files, such as movies, music, digital literature, and digital periodicals.

It may be appreciated from the foregoing discussion of FIGS. 6-8 that various technical effects may be achieved when implementing enhanced updating as discussed herein. Among other possible benefits, bandwidth is conserved by providing delta files over complete files. In addition, supporting a limited set of delta files conserves production and maintenance resources.

Figure 9:
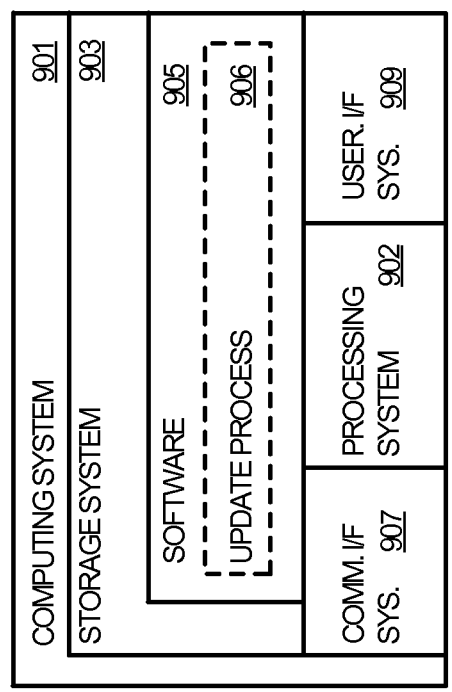
FIG. 9 illustrates a computing system suitable for implementing any of the applications, services, processes, architectures, and operational scenarios disclosed herein with respect to FIGS. 1-9 and discussed below in the Technical Disclosure.

FIG. 9 illustrates computing system 901 that is representative of any system or collection of systems in which the various operational architectures, scenarios, and processes disclosed herein may be implemented. Examples of computing system 901 includes, but is not limited to, smart phones, laptop computers, tablet computers, desktop computers, hybrid computers, gaming machines, virtual machines, smart televisions, smart watches and other wearable devices, as well as any variation or combination thereof. Other examples include server computers, rack servers, web servers, cloud computing platforms, and data center equipment, as well as any other type of physical or virtual server machine, and any variation or combination thereof.

Computing system 901 may be implemented as a single apparatus, system, or device or may be implemented in a distributed manner as multiple apparatuses, systems, or devices. Computing system 901 includes, but is not limited to, processing system 902, storage system 903, software 905, communication interface system 907, and user interface system 909. Processing system 902 is operatively coupled with storage system 903, communication interface system 907, and user interface system 909.

Processing system 902 loads and executes software 905 from storage system 903. Software 905 includes at least update process 906, which is representative of update process 200, update process 300, and update process 700 discussed with respect to the foregoing implementations. When executed by processing system 902 to enhance how digital content is updated, software 905 directs processing system 902 to operate as described herein for at least the various processes, operational scenarios, and sequences discussed in the foregoing implementations. Computing system 901 may optionally include additional devices, features, or functionality not discussed for purposes of brevity.

Referring still to FIG. 9, processing system 902 may comprise a micro-processor and other circuitry that retrieves and executes software 905 from storage system 903. Processing system 902 may be implemented within a single processing device, but may also be distributed across multiple processing devices or sub-systems that cooperate in executing program instructions. Examples of processing system 902 include general purpose central processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device, but may also be implemented across multiple storage devices or sub-systems co-located or distributed relative to each other. Storage system 903 may comprise additional elements, such as a controller, capable of communicating with processing system 902 or possibly other systems.

Software 905 may be implemented in program instructions and among other functions may, when executed by processing system 902, direct processing system 902 to operate as described with respect to the various operational scenarios, sequences, and processes illustrated herein. For example, software 905 may include program instructions for implementing an update agent or an update service and their respective functionality.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multithreaded, or in accordance with any other suitable execution paradigm, variation, or combination thereof. Software 905 may include additional processes, programs, or components, such as operating system software or other application software, in addition to or that include update process 906. Software 905 may also comprise firmware or some other form of machine-readable processing instructions executable by processing system 902.

In general, software 905 may, when loaded into processing system 902 and executed, transform a suitable apparatus, system, or device (of which computing system 901 is representative) overall from a general-purpose computing system into a special-purpose computing system customized to facilitate enhanced updating for digital content. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Referring again to FIGS. 1-3 as an example, through the operation of a computing system or systems of which computing system 901 is representative, transformations may be performed with respect to update architecture 100, and file 103 in particular. As an example, the update state of file 103 may be that it has been updated to version 3. Upon update service 111 employing update process 200 and update agent 102 employing update process 300, delta file 123 is downloaded and used to update file 103 to version 5, thereby changing it to a new update state.

It may be understood that computing system 901 is generally intended to represent a computing system or systems on which software 905 may be deployed and executed in order to implement enhanced digital content updates. However, computing system 901 may also be suitable as any computing system on which software 905 may be staged and from where one or both may be distributed, transported, downloaded, or otherwise provided to yet another computing system for deployment and execution, or yet additional distribution.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 909 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 909. In some cases, the input and output devices may be combined in a single device, such as a display capable of displaying images and receiving touch gestures. The aforementioned user input and output devices are well known in the art and need not be discussed at length here.

User interface system 909 may also include associated user interface software executable by processing system 902 in support of the various user input and output devices discussed above. Separately or in conjunction with each other and other hardware and software elements, the user interface software and user interface devices may support a graphical user interface, a natural user interface, or any other type of user interface.

Communication between computing system 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

While FIGS. 1-9 generally depict relatively few operational scenarios and sequences, it may be appreciated that the concepts disclosed herein may be applied at scale and routinely. For example, the update services disclosed herein could be deployed in support of any number of content and application environments.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A method for updating digital content comprising:
   receiving, by an update agent, a notification that a new version of a file of a set of files is available for downloading, wherein the file corresponding to the new version of the file is to be updated to the new version of the file as part of an update to the set of files;
   accessing, by the update agent based on the notification, an update manifest providing different update options associated with the set of files, wherein the update manifest comprises data that identifies a set of different delta files that are each usable for updating the file from previous versions of the file to the new version, data that identifies a complete file for updating the file to the new version, and data specifying as part of the update that a specific file is to be removed upon the specific file being identified in the set of files being updated;

determining, using the update manifest, if any of the set of different delta files can be used to update the file from the present version to the new version;

if the set of different delta files includes at least a delta file with which to update the file from the present version to the new version, downloading the delta file from an update service;

if a determination, using the update manifest, is made that none of the set of different delta files can be used to update the file from the present version to the new version, downloading the complete file with which to update the file to the new version; and if a determination, using the update manifest, is made that the file specified for removal in the manifest exists in the set of files being updated, removing the specified file from the set of files being updated.

2. The method of claim 1 further comprising identifying the file based on examining the update manifest, and wherein the update manifest identifies which subset of files of the set of files are subject to the update.

3. The method of claim 2 wherein the update manifest further identifies sets of delta files that are included in the update, wherein each of the sets of delta files corresponds to a different one of the subset of files that are subject to the update, and wherein a set of the sets of delta files is the set of different delta files.

4. The method of claim 1 wherein the update to the set of files comprises an update to a suite of applications that comprises a first application and a second application, and wherein the set of files comprises a first application file associated with the first application and a second application file associated with the second application.

5. The method of claim 1 wherein the set of files includes at least one of an application file, a media file, and an operating system file.

6. The method of claim 1, wherein the update service tracks an update state for each of a plurality of software packages, each of the plurality of software packages including a set of files.

7. The method of claim 6, wherein tracking the update state comprises tracking a share of installed instances of a plurality of software versions of the plurality of software packages.

8. The method of claim 7, wherein the update service generates an update manifest for a software version of the plurality of software packages based on determining that a share of installed instances for the software version is above a threshold share value.

9. The method of claim 6, wherein the update service generates an update manifest for each set of files of the plurality of software packages based on a corresponding update state of each of the plurality of software packages.

10. A system for updating digital content, comprising:
a memory for storing executable program code; and
one or more processors, functionally coupled to the memory, the one or more processors being responsive to computer-executable instructions contained in the program code and operative to:
receive, by an update agent, a notification that a new version of a file of a set of files is available for downloading, wherein the file corresponding to the new version of the file is to be updated to the new version of the file as part of an update to the set of files;

access, by the update agent based on the notification, an update manifest providing different update options associated with the set of files, wherein the update manifest comprises data that identifies a set of different delta files that are each usable for updating the file from previous versions of the file to the new version, data that identifies a complete file for updating the file to the new version, and data specifying as part of the update that a specific file is to be removed upon the specific file being identified in the set of files being updated;

determine, using the update manifest, if any of the set of different files can be used to update the file from the present version to the new version;

if the set of different delta files includes at least a delta file with which to update the file from the present version to the new version, download the delta file from an update service;

if a determination, using the update manifest, is made that none of the set of different delta files can be used to update the file from the present version to the new version, download the complete file with which to update the file to the new version; and if a determination, using the update manifest, is made that the file specified for removal in the manifest exists in the set of files being updated, remove the specified file from the set of files being updated.

11. The system of claim 10, wherein the one or more processors are further responsive to the computer-executable instructions contained in the program code and operative to:
examine, by the update agent, the update manifest, and wherein the update manifest identifies which subset of files of the set of files are subject to update.

12. The system of claim 11, wherein the update manifest identifies sets of delta files that are included in the update, wherein each one of the sets of delta files corresponds to a different one of the subset of files that are subject to the update, and wherein a set of the sets of delta files is the set of different delta files.

13. The system of claim 10, wherein the update to the set of files comprises an update to a suite of applications that comprises a first application and a second application, and wherein the set of files comprises a first application file associated with the first application and a second application file associated with the second application.

14. The system of claim 10, wherein the set of files includes at least one of an application file, a media file, and an operating system file.

15. One or more computer readable storage media having program instructions stored thereon for updating digital content that, when executed by a processing system, direct the processing system to at least:
receive, by an update agent, a notification that a new version of a file of a set of files is available for downloading, wherein the file corresponding to the new version of the file is to be updated to the new version of the file as part of an update to the set of files;

access, by the update agent based on the notification, an update manifest providing different update options associated with the set of files, wherein the update manifest comprises data that identifies a set of different delta files that are each usable for updating the file from previous versions of the file to the new version, data that identifies a complete file for updating the file to the new version, and data specifying as part of the update that a specific file is to be removed upon the specific file being identified in the set of files being updated;

determine, using the update manifest, if any of the set of different delta files can be used to update the file from the present version to the new version;

if the set of different delta files includes at least a delta file with which to update the file from the present version to the new version, download the delta file from an update service;

if a determination, using the update manifest, is made that none of the set of different delta files can be used to update the file from the present version to the new version, download the complete file with which to update the file to the new version; and if a determination, using the update manifest, is made that the file specified for removal in the manifest exists in the set of files being updated, remove the specified file from the set of files being updated.

16. The computer readable storage media of claim 15 wherein, the program instructions direct the processing system to examine the update manifest, and wherein the update manifest identifies which subset of files of the set of files are subject to the update.

17. The computer readable storage media of claim 16 wherein the update manifest identifies sets of delta files that are included in the update, wherein each one of the sets of delta files corresponds to a different one of the subset of files that are subject to the update, and wherein a set of the sets of delta files is the set of different delta files.

18. The computer readable storage media of claim 15 wherein the update to the set of files comprises an update to a suite of applications that comprises a first application and a second application, and wherein the set of files comprises a first application file associated with the first application and a second application file associated with the second application.

19. The computer readable storage media of claim 15 wherein the set of files includes at least one of an application file, a media file, and an operating system file.

* * * * *